US009386172B2

(12) United States Patent
Kishida

(10) Patent No.: US 9,386,172 B2
(45) Date of Patent: Jul. 5, 2016

(54) IMAGE FORMING SYSTEM THAT PERFORMS AUTHENTICATION OF A CONSUMABLE MEMBER

(71) Applicant: KYOCERA Document Solutions Inc., Osaka-shi, Osaka (JP)

(72) Inventor: Kentaro Kishida, Osaka (JP)

(73) Assignee: KYOCERA DOCUMENT SOLUTIONS INC., Osaka-Shi, Osaka (JP)

(*) Notice: Subject to any disclaimer, the term of this patent is extended or adjusted under 35 U.S.C. 154(b) by 0 days.

(21) Appl. No.: 14/792,655

(22) Filed: Jul. 7, 2015

(65) Prior Publication Data

US 2016/0014286 A1 Jan. 14, 2016

(30) Foreign Application Priority Data

Jul. 9, 2014 (JP) .................. 2014-141291

(51) Int. Cl.
G06F 3/12 (2006.01)
H04N 1/00 (2006.01)
H04N 1/32 (2006.01)

(52) U.S. Cl.
CPC ....... *H04N 1/00344* (2013.01); *H04N 1/00244* (2013.01); *H04N 1/00323* (2013.01); *H04N 1/32122* (2013.01); *H04N 2201/0094* (2013.01)

(58) Field of Classification Search
CPC .................................................. H04N 1/00344
USPC ........................................ 358/1.14, 1.15, 1.9
See application file for complete search history.

(56) References Cited

U.S. PATENT DOCUMENTS

| 2003/0035129 A1* | 2/2003 | Phillips | B41J 2/17546 358/1.14 |
| 2005/0244169 A1* | 11/2005 | Ono | G03G 15/55 399/12 |
| 2006/0045595 A1* | 3/2006 | Hanaoka | B41J 2/17546 400/62 |
| 2006/0291872 A1* | 12/2006 | Mei | B41J 2/17546 399/12 |
| 2008/0273883 A1* | 11/2008 | Kim | B41J 2/17546 399/12 |
| 2014/0233967 A1* | 8/2014 | Suzuki | G03G 15/502 399/12 |

FOREIGN PATENT DOCUMENTS

| JP | 2005221606 A | * | 8/2005 |
| JP | 2005-251156 A | | 9/2005 |
| JP | 2009-014991 A | | 1/2009 |
| JP | 2009-288274 A | | 12/2009 |
| JP | 2011-141421 A | | 7/2011 |
| JP | 2013-049180 A | | 3/2013 |

* cited by examiner

*Primary Examiner* — Benjamin O Dulaney

(57) ABSTRACT

An image forming system includes an image forming apparatus configured to form an image and a server coupled to the image forming apparatus so as to be communicable with the image forming apparatus. The server includes a server storage unit configured to store a list of the identification symbol given to the consumable member, a server reception unit configured to receive the data regarding the identification symbol transmitted from the image forming apparatus transmission unit, a determination unit configured to determine whether or not there is an identification symbol corresponding to the data regarding the identification symbol received by the server reception unit in the list of the identification symbol stored in the server storage unit, and a control unit configured to, if the determination unit determines that there is the identification symbol, perform control to make the consumable member usable.

5 Claims, 9 Drawing Sheets

IMAGE FORMING SYSTEM THAT PERFORMS AUTHENTICATION OF A CONSUMABLE MEMBER

INCORPORATION BY REFERENCE

The disclosure of Japanese Patent Application No. 2014-141291 filed on Jul. 9, 2014, including the specification, drawings and abstract is incorporated herein by reference in its entirety.

BACKGROUND

This disclosure relates to an image forming system.

In an image forming apparatus, which is typified by a digital multifunctional peripheral and the like, an image of an original document is read out by an image reading unit, and then, an electrostatic latent image is formed on a photoreceptor provided to an image forming unit on the basis of the readout image. Thereafter, a charged toner is fed from a developing apparatus onto the formed electrostatic latent image to form a visible image, the image is transferred and fixed onto a paper, and then, the paper is discharged to the outside of the apparatus. As the number of formed images increases, a consumable, such as a toner and the like, is consumed. Thus, a toner cartridge or a toner container in which a toner as a consumable is filled is removably attached to the image forming apparatus. The toner is allowed to be supplied to the image forming apparatus at all times by replacing the toner cartridge or the toner container.

A typical image forming apparatus management system is configured such that a digital certificate on which identification information of a device that uses the cartridge is stored in a process cartridge used in an image forming apparatus and a controller of the image forming apparatus authenticates the process cartridge using the digital certificate at start-up. If the authentication fails, it is determined that the process cartridge is not a genuine unit, and a warning is issued by displaying a warning message, or the like. If identification information of the image forming apparatus is not described on the digital certificate, it is determined that the process cartridge is a cartridge which the image forming apparatus is not allowed to use, and a warning is also issued.

Also, a typical image forming apparatus is characterized by including a reading unit configured to read toner unit related information and first authentication information from an IC chip, an authentication information generation unit configured to generate second authentication information from a second authentication key held by the image forming apparatus and partial information that is a part of the toner unit related information read by the reading unit, and an authentication unit configured to perform authentication of a toner unit on the basis of the first authentication information read by the reading unit and the second authentication information generated by the authentication information generation unit.

A typical image forming apparatus provided with a replacement part removably attached thereto includes an apparatus control unit configured to control the entire image forming apparatus, an authentication data storage unit configured to store authentication data given to the image forming apparatus, and a first communication unit that is provided in the image forming apparatus to communicate with the replacement part, and is characterized in that the replacement part includes a second communication unit configured to communicate with the first communication unit, an authentication information storage unit that is capable of storing authentication information of a plurality of types, and an authentication information control unit configured to receive authentication data through communication and output a determination result obtained in determining whether or not authentication is possible from the authentication data and the authentication information stored in the authentication information storage unit, and the apparatus control unit determines contents of apparatus control on the basis of a determination result acquired via the first communication unit and the second communication unit.

Conventionally, an image forming apparatus configured such that the production period of a toner cartridge, a threshold of elapsed time after production, and processing information in exceeding the threshold of elapsed time are stored in a wireless tag as attribute information and a control unit is configured to calculate, when the toner cartridge is newly mounted, elapsed time after production of the toner cartridge on the basis of the production period, and execute, if the calculated elapsed time is over the threshold of elapsed time, initialization processing on the basis of the processing information is known.

A typical image forming apparatus includes a toner consumption time limit management apparatus that performs toner consumption time limit management in an attachable and removable toner container in a removable toner container, a toner using environment numerical value detection unit, and a timer unit, and is characterized in that a toner consumption time limit is reduced in accordance with time in which a value detected by the toner using environment numerical value detection unit is out of a setting range.

SUMMARY

According to an aspect of the present disclosure, an image forming system includes an image forming apparatus configured to form an image and a server coupled to the image forming apparatus so as to be communicable with the image forming apparatus. The image forming apparatus includes an image forming apparatus transmission unit configured to transmit data regarding an identification symbol given to a consumable member attachably and removably provided in the image forming apparatus to the server. The server includes a server storage unit, a server reception unit, a determination unit, and a control unit. The server storage unit stores a list of the identification symbol given to the consumable member. The server reception unit receives the data regarding the identification symbol transmitted from the image forming apparatus transmission unit. The determination unit determines whether or not there is an identification symbol corresponding to the data regarding the identification symbol received by the server reception unit in the list of the identification symbol stored in the server storage unit. If the determination unit determines that there is the identification symbol, the control unit performs control to make the consumable part usable.

In another aspect of the present disclosure, an image forming system includes an image forming apparatus configured to form an image and a server coupled to the image forming apparatus so as to be communicable with the image forming apparatus. The image forming apparatus includes an image forming apparatus transmission unit configured to transmit data regarding an expiration date provided to a consumable member attachably and removably provided in the image forming apparatus to the server. The server includes a server storage unit, a server reception unit, a time information acquisition unit, a determination unit, and a control unit. The server storage unit stores the data regarding the expiration date provided to the consumable member. The server reception unit receives the data regarding the expiration date transmitted from the image forming apparatus transmission unit. The time information acquisition unit acquires time information. The determination unit determines from the data regarding the expiration date received by the server reception unit and the time information acquired through time information acquisition whether or not a use of the consumable member is before the expiration date. If the determination unit determines that the use is before the expiration date, the control unit performs control to make the consumable member usable.

DETAILED DESCRIPTION

Figure 1:
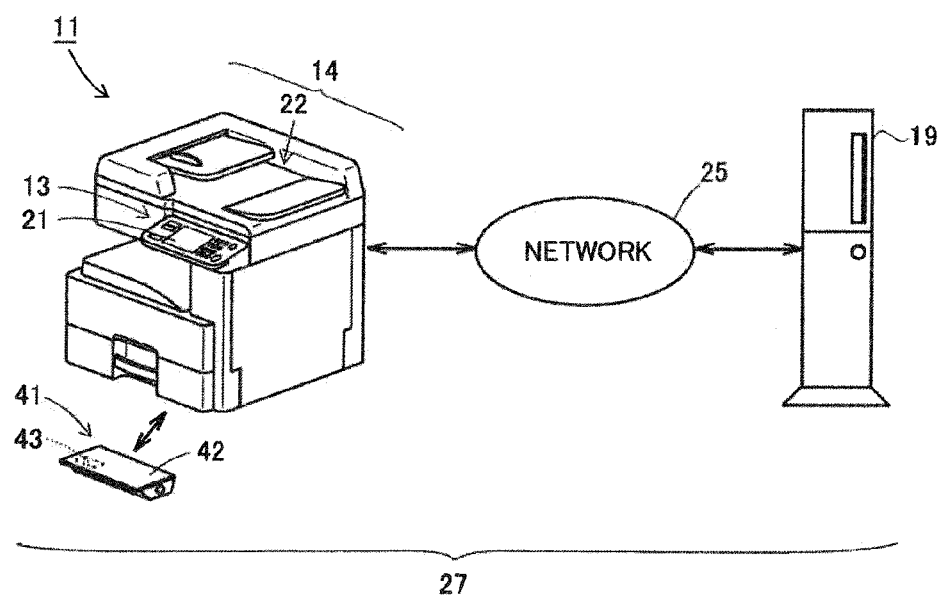
FIG. 1 is a schematic view illustrating an outer appearance of a server included in a digital multifunctional peripheral achieved by applying an image forming apparatus included in an image forming system according to an embodiment of the present disclosure to a digital multifunctional peripheral, and the image forming system.
Figure 2:
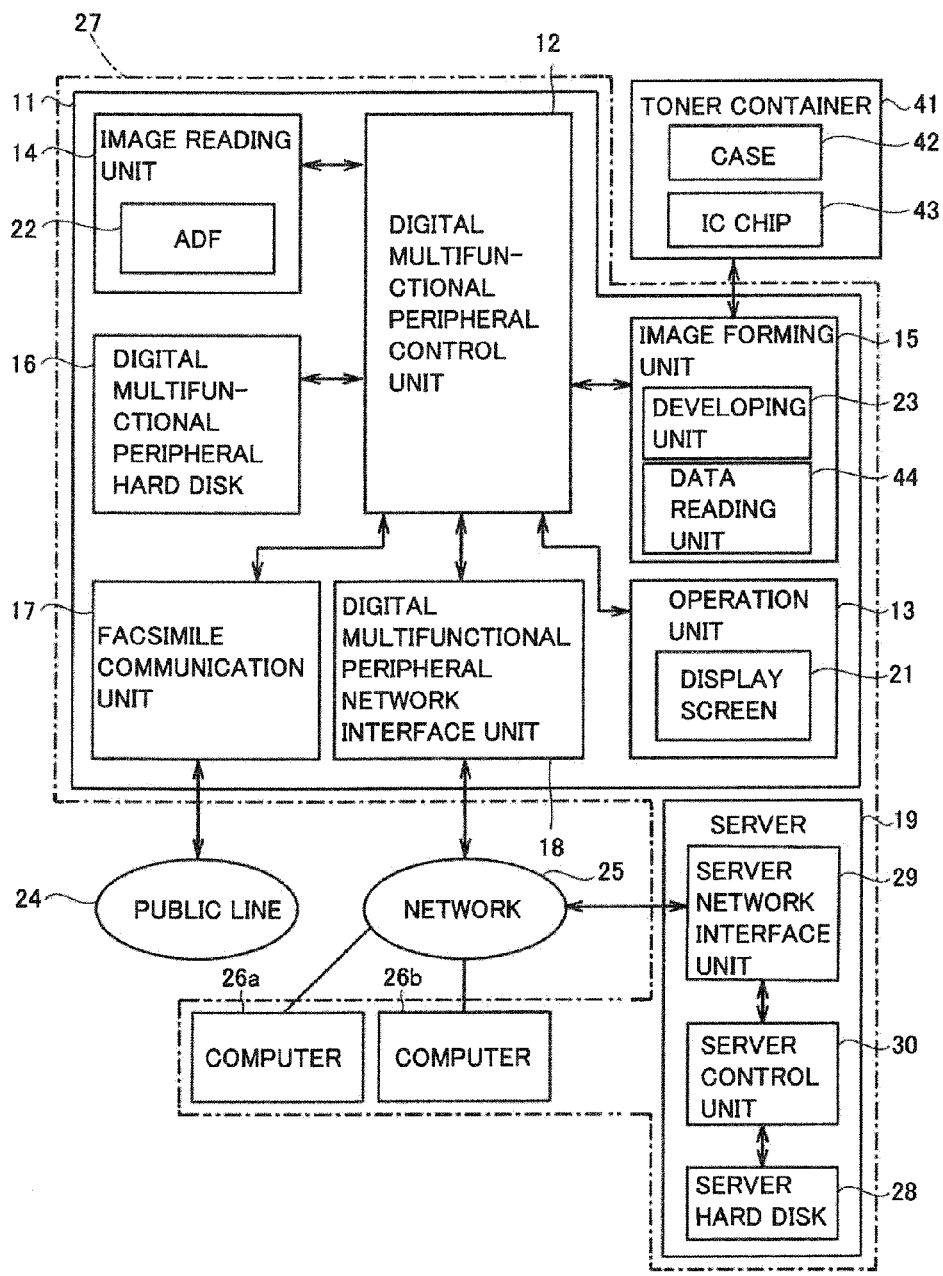
FIG. 2 is a block diagram illustrating a configuration of a server included in a digital multifunctional peripheral achieved by applying an image forming apparatus included in an image forming system according to the embodiment to a digital multifunctional peripheral, and the image forming system.

Embodiments of the present disclosure will be described below. First, a configuration of an image forming system according to an embodiment of the present disclosure will be described. FIG. 1 is a schematic view illustrating an outer appearance of a server included in a digital multifunctional peripheral achieved by applying an image forming apparatus included in an image forming system according to an embodiment of the present disclosure to a digital multifunctional peripheral, and the image forming system. FIG. 2 is a block diagram illustrating a configuration of a server included in a digital multifunctional peripheral achieved by applying an image forming apparatus included in an image forming system according to the embodiment to a digital multifunctional peripheral, and the image forming system.

With reference to FIG. 1 and FIG. 2, a digital multifunctional peripheral 11 as an image forming apparatus includes a digital multifunctional peripheral control unit 12 configured to control the entire digital multifunctional peripheral 11, an operation unit 13 that includes a display screen 21 configured to display information transmitted from the digital multifunctional peripheral 11 and contents of input by a user and is configured to urge the user to input image forming conditions, such as the number of pint copies, a gradation property, and the like, and on and off of power, an image reading unit 14 that includes an auto document feeder (ADF) 22 configured to automatically feed an original document set therein to a reading unit and is configured to read an image of the original document, an image forming unit 15 that includes a developing unit 23 configured to perform development using a toner container 41 in which a toner is filled and which supplies the toner into the developing unit 23 at all times and the toner and is configured to form an image on the basis of the read image and image data transmitted via a network 25, a digital multifunctional peripheral hard disk 16 configured to store transmitted image data, the input image forming conditions, and the like, a facsimile communication unit 17 coupled to a public line 24 and configured to perform facsimile transmission and facsimile reception, and a digital multifunctional peripheral network interface unit 18 used for providing a connection with the network 25. Note that the digital multifunctional peripheral 11 includes a dynamic random access memory (DRAM) that performs writing and reading of image data, a paper conveyance unit configured to convey a paper, and the like, but the illustration and description of these members is omitted. Also, the arrows illustrated in FIG. 2 indicate flows of data regarding a control signal, control, and an image.

The digital multifunctional peripheral 11 forms an image in the image forming unit 15 using an original document read by the image reading unit 14, and thus, operates as a copy machine. The digital multifunctional peripheral 11 forms an image in the image forming unit 15 using image data transmitted from computers 26a and 26b coupled to the network 25 via the digital multifunctional peripheral network interface unit 18 to print the formed image on a paper, and thus, operates as a printer. That is, the image forming unit 15 operates as a print unit configured to print a requested image. The digital multifunctional peripheral 11 forms an image in the image forming unit 15 via the DRAM using image data transmitted from the public line 24 via the facsimile communication unit 17, or transmits image data of an original document read by the image reading unit 14 to the public line 24 via the facsimile communication unit 17, and thus, operates as a facsimile apparatus. That is, the digital multifunctional peripheral 11 has a plurality of functions, such as a copy function, a printer function, a facsimile function, and the like, for image processing. Furthermore, for each function, a function that may be set in detail is provided.

An image forming system 27 according to this embodiment includes the digital multifunctional peripheral 11, the plurality of computers 26a and 26b, and a server 19 that stores data. Specifically, the image forming system 27 includes the digital multifunctional peripheral 11 having the above-described configuration, the plurality of computers 26a and 26b coupled to the digital multifunctional peripheral 11 via the network 25, and the server 19 coupled to the digital multifunctional peripheral 11, as well, via the network 25. In this embodiment, as the plurality of computers 26a and 26b, two computers are illustrated. Also, the server 19 is a type of computer and is provided separately from the digital multifunctional peripheral 11. The server 19 is provided so as to be communicable with the digital multifunctional peripheral 11. The server 19 has a configuration including a server hard disk 28 as a server storage unit configured to store various types of data, such as image data, user registration information, and the like, a server network interface unit 29 used for providing a connection with the network 25, and a server control unit 30 configured to control the entire server 19. Each of the computers 26a and 26b and the server 19 is capable of making a print request to the digital multifunctional peripheral 11 via the network 25 to perform printing. The digital multifunctional peripheral 11, the computers 26a and 26b, and the server 19 may be coupled to one another via a wire using a local area network (LAN) cable, or the like, or may be wirelessly coupled to one another, and a configuration in which another digital multifunctional peripheral and a server are coupled in the network 25 may be also employed.

A configuration of a toner container 41 attachably and removably provided in the digital multifunctional peripheral 11 will be described below. The toner container 41 is attachably and removably provided inside the digital multifunctional peripheral 11, specifically, in a part thereof located close to the developing unit 23. That is, a user may attach the toner container 41 to a predetermined part of the digital multifunctional peripheral 11 or remove the toner container 41 attached to the predetermined part therefrom. An individual identification symbol is given to the toner container 41. The toner container 41 includes a case 42 in which a toner is filled. An integrated circuit (IC) chip 43 in which data regarding the identification symbol of the toner container 41 is stored is buried in a part of the case 42. That is, the toner container 41 includes the IC chip 43 that stores the data regarding the identification symbol. In this case, as for the data regarding the identification symbol, encrypted data obtained by hashing an identification symbol using a hash function and encrypting a hash value generated by the hashing is stored. As for the encrypted data obtained by encrypting the hash value, the data amount thereof is very small. Note that the IC chip 43 may be attached to a surface of the case 42 so as to stick thereon. The digital multifunctional peripheral 11 is provided with a data reading unit 44 configured to read the data regarding the identification symbol stored in the IC chip 43 buried in the toner container 41. The data reading unit 44 is capable of reading the encrypted data stored in the IC chip 43.

Figure 3:
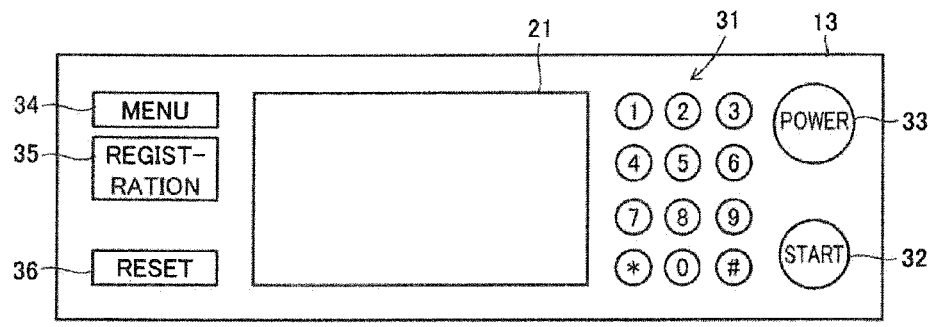
FIG. 3 is an outside view illustrating a schematic configuration of an operation unit.

Next, a configuration of the above-described operation unit 13 will be described in further detail. FIG. 3 is an outside view illustrating a schematic configuration of the operation unit 13. With reference to FIG. 1 to FIG. 3, the operation unit 13 includes a numeric keypad 31 used for inputting numbers 0 to 9 used for inputting the number of print copies and the like and symbols, such as "*" and "#", a start key 32 used for instructing a start of printing and a start of facsimile transmission, a power key 33 used for inputting on and off of power of the digital multifunctional peripheral 11, a menu key 34 used for instructing selection of a printer function, a copy function, or the like, of the digital multifunctional peripheral 11, a registration key 35 used for instructing various image forming conditions and user registration, a reset key 36 used for cancelling contents of an instruction input by the user using the numeric keypad 31 or the like, and the above-described display screen 21. The display screen 21 includes a liquid crystal touch panel function and allows the user to perform selection of a function and the like, as well as input of image forming conditions and the like, from the display screen 21 by pressing thereon with a finger of the user or the like.

Figure 4:
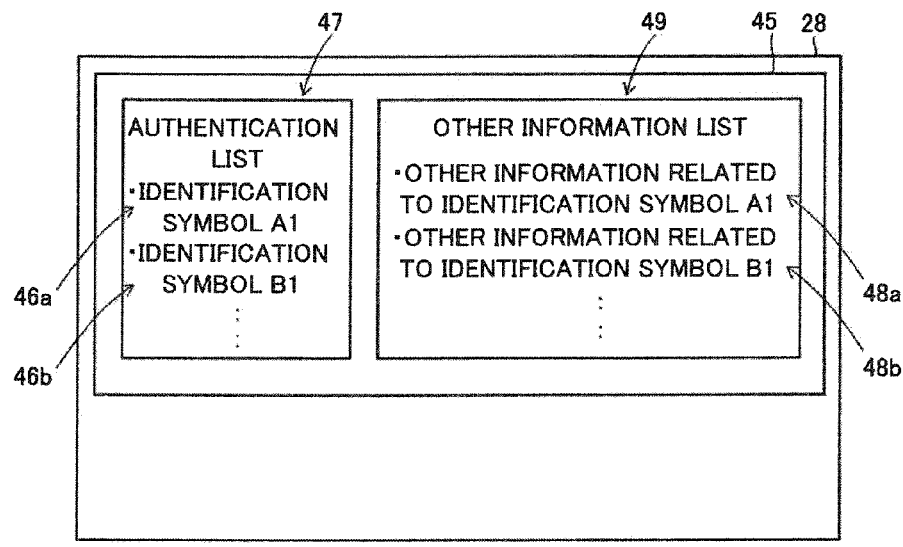
FIG. 4 is a conceptual view illustrating contents of data stored in a server hard disk.

Next, data stored in the server hard disk 28 included in the server 19 will be described. FIG. 4 is a conceptual view illustrating contents of data stored in the server hard disk 28. With reference to FIG. 4, a storage area 45 of the server hard disk 28 includes an identification symbol data storage unit 47 configured to store data 46a and data 46b regarding identification symbols given to the toner container 41 as a consumable, that is, specifically, data 46a regarding an identification symbol A1 and data 46b regarding an identification symbol B1, and an information data storage unit 49 configured to store data regarding other information for each toner container 41 as a consumable, that is, specifically, data 48a regarding other information than the data regarding the identification symbol A1 of the toner container 41 to which the identification symbol A1 is given and data 48b regarding other information than the data regarding the identification symbol B1 of the toner container 41 to which the identification symbol B1 is given. The data 48a regarding other information is, for example, data regarding information of date of production of the toner container 41 to which the identification symbol A1 is given, a production site thereof, a manufacturer thereof, and the like. In the server hard disk 28, the data 46a and the data 46b regarding the identification symbols, which are stored in the identification symbol data storage unit 47, and the data 48a and the data 48b regarding other information corresponding to the identification symbols A1 and B1, respectively, which are stored in the information data storage unit 49, are stored in association with one another. In this case, as for the data 46a and the data 46b regarding the identification symbol A1 and the identification symbol B1, the hash values of the identification symbols A1 and B1 generated using the hash function are stored as the data 46a and the data 46b in a list form.

Figure 5:
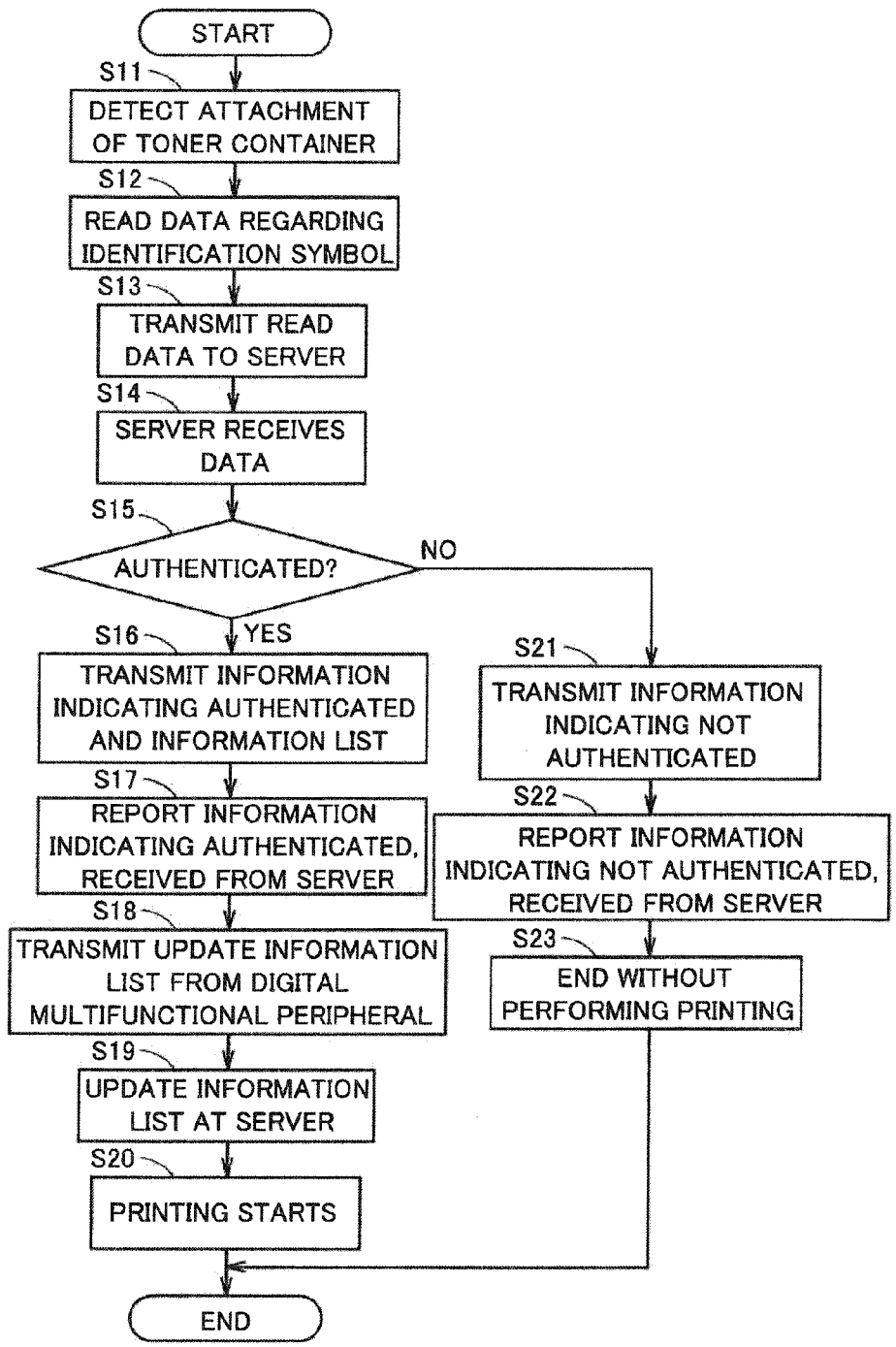
FIG. 5 is a flow chart illustrating contents of processing when authentication of a toner container is performed using an image forming system according to the embodiment.

Next, a case where the toner container 41 as a consumable member is authenticated using the image forming system 27 according to this embodiment will be described. FIG. 5 is a flow chart illustrating contents of processing when authentication of the toner container 41 is performed using the image forming system 27 according to this embodiment.

With reference to FIG. 5 and the like, when a user attaches the toner container 41 to the digital multifunctional peripheral 11, the digital multifunctional peripheral 11 detects that the attachable and removable toner container 41 was attached in the digital multifunctional peripheral 11 (Step S11 in FIG. 5, "Step" will be omitted hereinafter). In this case, a detection sensor (not illustrated) configured to detect that the toner container 41 was attached and provided in the digital multifunctional peripheral 11 is used for the detection.

Next, the digital multifunctional peripheral 11 reads data regarding an identification symbol from the toner container 41 through the data reading unit 44 (S12). In this case, the data reading unit 44 reads encrypted data obtained by encrypting the hash value of the identification symbol generated using the hash function from the IC chip 43 included in the toner container 41. Thereafter, the read data regarding the identification symbol, that is, the encrypted data, is transmitted to a server (S13). In this case, the encrypted data is transmitted by the digital multifunctional peripheral network interface unit 18 via the network 25. In this step, the digital multifunctional peripheral network interface unit 18 operates as an image forming apparatus transmission unit.

Next, the server 19 receives the transmitted data regarding the identification symbol through the server network interface unit 29 (S14). In this step, the server network interface unit 29 operates as a server reception unit. Then, authentication of the toner container 41 is performed (S15). Specifically, for the data regarding the identification symbol received by the server network interface unit 29, decryption of the encrypted data is performed and the generated hash value is introduced. Then, it is determined whether or not there is the decrypted hash value in a list of data regarding identification symbols stored in the identification symbol data storage unit 47 of the server hard disk 28, that is, specifically, a list of hash values of the identification symbols A1 and B1 stored in a list form.

If it is determined that there is the received data regarding the identification symbol in the list of data regarding identification symbols stored in the identification symbol data storage unit 47 of the server hard disk 28, that is, the decrypted hash value is among the plurality of hash values stored in a list form, it is determined that the received data regarding the identification symbol is authenticated (YES in S15). Thereafter, the server 19 transmits a report indicating that the received data regarding the identification symbol was authenticated (S16). Also, the server 19 transmits the data 48a regarding other information regarding another identification symbol A1, that is, an information list regarding the identification symbol A1 in this case, as well as the report indicating that the received data regarding the identification symbol was authenticated.

Figure 6:
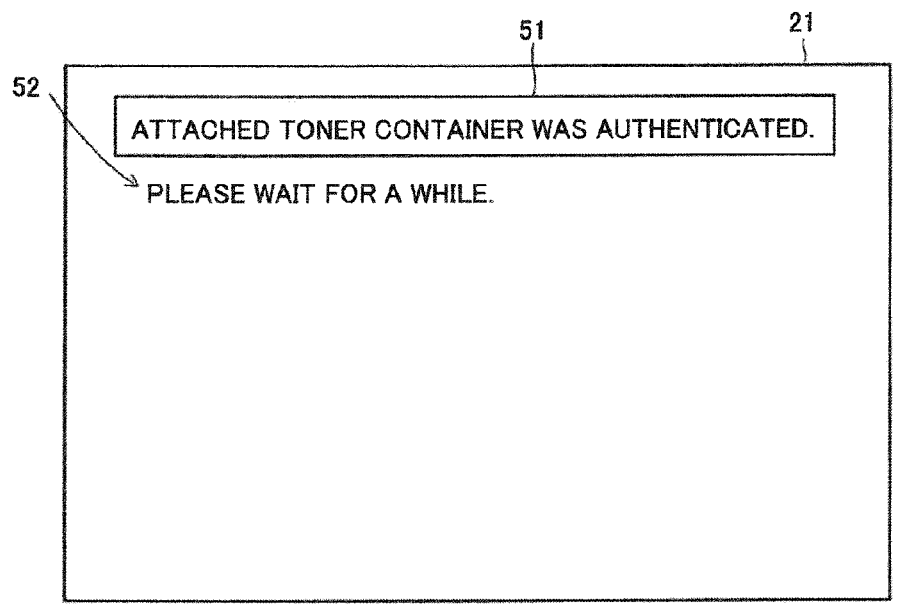
FIG. 6 is a view illustrating an example of a report screen displayed on a display screen included in the operation unit.

Thereafter, the digital multifunctional peripheral 11 receives the data 48a regarding the other information transmitted from the server 19 as well as the report indicating that the received data regarding the identification symbol was authenticated. Then, the digital multifunctional peripheral 11 reports to the display screen 21 of the operation unit 13 that the digital multifunctional peripheral 11 received the report indicating that the received data regarding the identification symbol was authenticated (S17). FIG. 6 is a view illustrating an example of a report screen in this case. With reference to FIG. 6, on the display screen 21 of the operation unit 13, displayed are a message 51 "ATTACHED TONER CONTAINER WAS AUTHENTICATED." and also a message 52 "PLEASE WAIT FOR A WHILE." because it takes a while for a subsequent processing to start.

Next, the digital multifunctional peripheral 11 updates an information list stored in advance in the digital multifunctional peripheral hard disk 16 on the basis of the transmitted data 48a, and transmits the update information list, which was updated, to the server 19 (S18). Thereafter, the server 19 updates the data 48a, among other information lists stored in the server, on the basis of the received update information list (S19). Thereafter, printing is started (S20).

Figure 7:
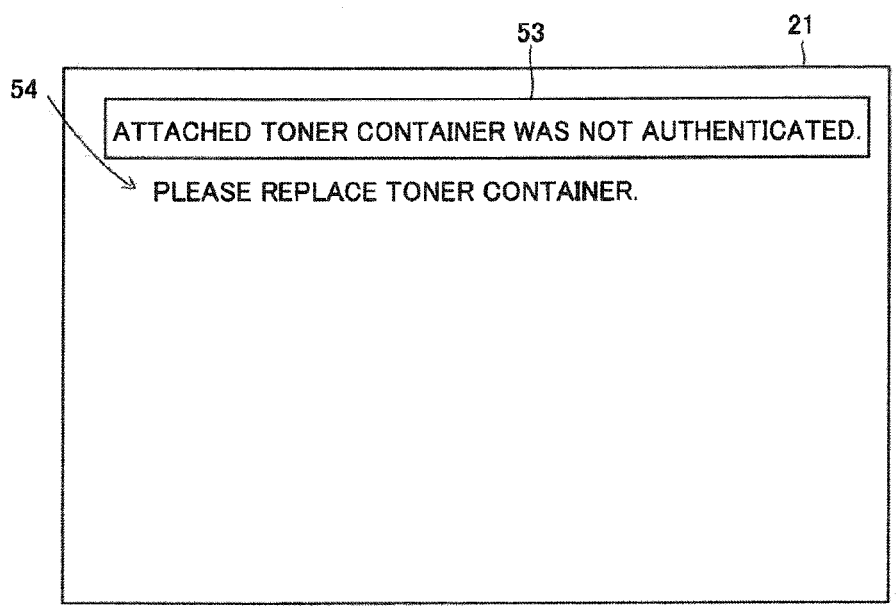
FIG. 7 is a view illustrating an example of a report screen displayed on a display screen included in the operation unit.

On the other hand, if it is determined that the received data regarding the identification symbol is not in the list of data regarding the identification symbols stored in the identification symbol data storage unit 47 of the server hard disk 28, that is, if it is determined that the hash value does not match, the received data regarding the identification symbol is not authenticated (NO in S15). Thereafter, the server 19 transmits information indicating that the received data regarding the identification symbol was not authenticated (S21). When the digital multifunctional peripheral 11 receives information indicating that the received data regarding the identification symbol was not authenticated, the digital multifunctional peripheral 11 reports this on the display screen 21 of the operation unit 13 (S22). FIG. 7 is a view illustrating an example of the display screen 21 in this case. With reference to FIG. 7, a message 53 "ATTACHED TONER CONTAINER WAS NOT AUTHENTICATED." and a message 54 "PLEASE REPLACE TONER CONTAINER", urging the user to replace the toner container 41, are displayed on the display screen 21 of the operation unit 13. Thereafter, processing is ended without performing printing (S23).

In the image forming system 27 described above, the server 19 includes a server reception unit configured to receive data regarding an identification symbol transmitted from the image forming apparatus transmission unit, a determination unit configured to determine whether or not there is the identification symbol given to the toner container 41 in a list of identification symbols stored in the server hard disk 28, and a control unit configured to, if the determination unit determines that there is the identification symbol given to the toner container 41, perform control to make the toner container 41 usable, and therefore, authentication of the toner container 41 may be performed in the server 19. With such an authentication system, not authentication in a closed environment between the digital multifunctional peripheral 11 and the toner container 41 but authentication via the server 19 is performed, so that more reliable authentication of the toner container 41 may be enabled and a risk in which an authentication key or the like is decrypted may be reduced. If an algorithm of authentication is analyzed, the algorithm of authentication at the server 19 may be changed, even after the toner container 41 has been shipped out, and therefore, there is no need to rewrite an authentication system of the digital multifunctional peripheral 11, so that burdens on a system side may be reduced. Accordingly, with the above-described image forming system 27, authentication of the toner container 41 may be reliably performed and burdens on the system side may be reduced.

Data regarding an identification symbol is a hash value generated by encryption using the hash function, and therefore, highly accurate authentication may be performed.

In this case, the digital multifunctional peripheral 11 includes the data reading unit 44 configured to read data regarding an identification symbol stored in the IC chip 43 that is included in the toner container 41 and is configured to store data regarding an identification symbol, and therefore, the user's time and effort to input an identification symbol and the like may be reduced, and a simpler system may be constructed. Also, highly accurate authentication may be performed. In this case, only encrypted data is stored in the IC chip 43, and therefore, when an authentication system is constructed in a closed environment between the digital multifunctional peripheral 11 and the toner container 41, there is no need to use vast amounts of data of identification symbols associated with a complicate authentication system, the amount of information stored in the IC chip 43 may be reduced, and thus, construction of a more efficient authentication system is enabled.

Also, in this case, the server hard disk 28 stores data regarding other information corresponding to the identification symbol, and the control unit performs, if the determination unit determines that there is the identification symbol, control such that the data regarding other information corresponding to the identification symbol is transmitted by the image forming apparatus transmission unit, so that update information may be reflected to the data regarding the other information and, by using this, a more sophisticated authentication system may be achieved.

Note that, although, in the above-described embodiment, a hash value is generated using the hash function and the generated hash value is used as data regarding an identification symbol, the present disclosure is not limited thereto, but an identification symbol itself may be used as data regarding the identification symbol, and other encryption processing may be performed thereon to use a resultant of the other encryption processing as data regarding an identification symbol.

Also, although, in the above-described embodiment, data regarding an identification symbol is stored in an IC chip buried in a toner container, the present disclosure is not limited thereto, for example, an identification symbol may be put on a toner container, a user may input the identification symbol using a display screen of an operation unit or the like, and the identification symbol may be transmitted to a server.

Note that the server may further include a time information acquisition unit configured to acquire time information and the determination unit may be configured to determine whether or not to make a consumable member usable in accordance with the time information acquired by the time information acquisition unit. That is, an expiration date is set in terms of time, instead of a physical expiration date set on the basis of, for example, that the toner is used up and the like, such that if, even when the identification symbol matches and is authenticated, the set expiration date has passed, a use of the toner container is made not possible. Thus, whether or not a use of a consumable member is possible is determined based on time information, thereby allowing construction of a more appropriate image forming system.

Figure 8:
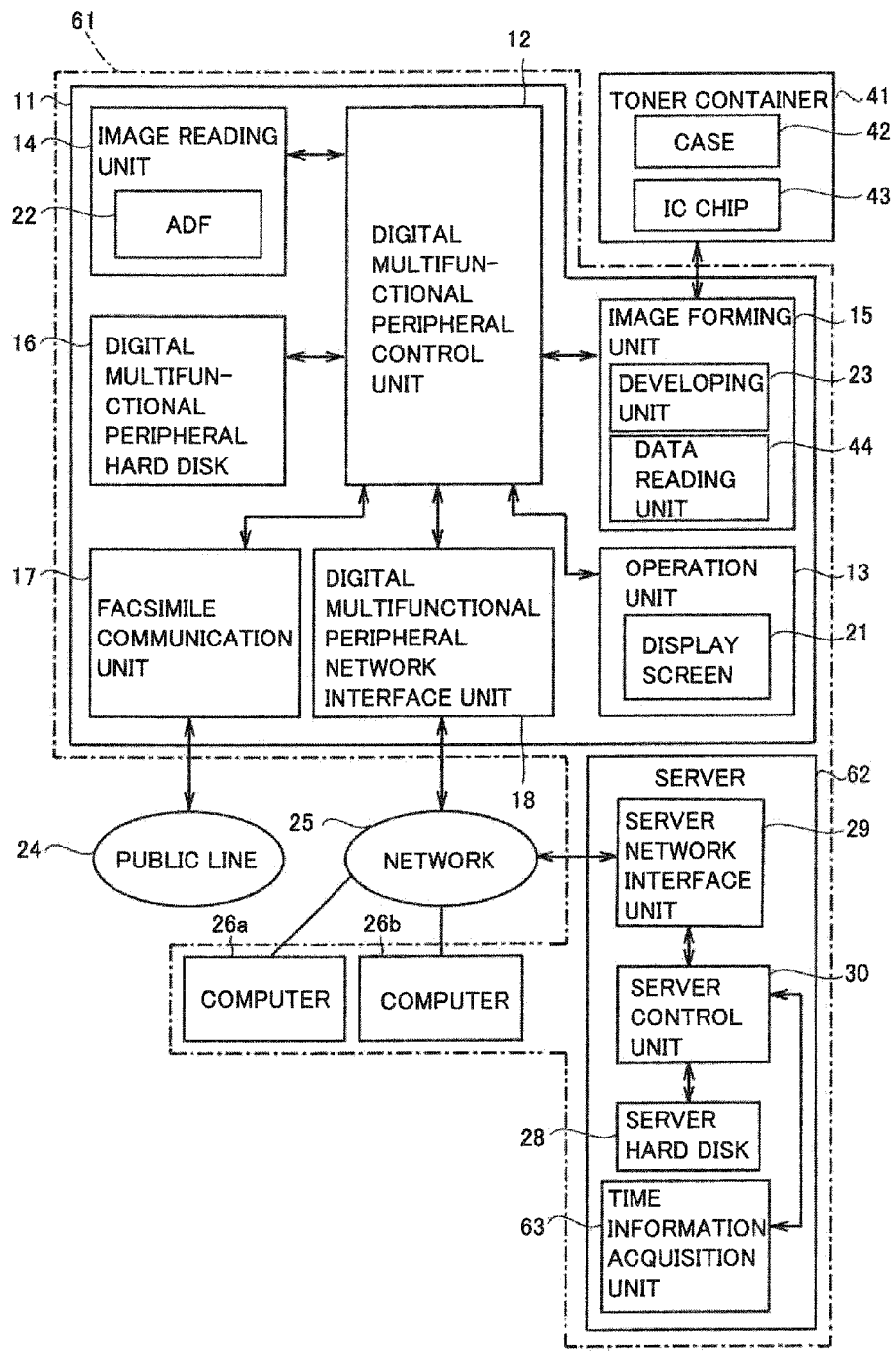
FIG. 8 is a block diagram illustrating a configuration of a server included in a digital multifunctional peripheral achieved by applying an image forming apparatus included in an image forming system according to another embodiment of the present disclosure to a digital multifunctional peripheral, and the image forming system.

FIG. 8 is a block diagram illustrating a configuration of a server included in a digital multifunctional peripheral achieved by applying an image forming apparatus included in an image forming system according to another embodiment of the present disclosure to a digital multifunctional peripheral, and the image forming system. FIG. 8 corresponds to FIG. 2, the same components described in FIG. 8 and FIG. 2 are denoted by the same reference characters, and the configuration thereof and the like will not be described.

With reference to FIG. 8, a server 62 included in an image forming system 61 is provided so as to be communicable with a digital multifunctional peripheral 11. The server 62 includes a server hard disk 28 as a server storage unit configured to store various types of data, such as image data, user registration information, and the like, a server network interface unit 29 used for providing a connection with a network 25, a server control unit 30 configured to control an entire server 19, and a time information acquisition unit 63 configured to externally acquire time information. The time information acquisition unit 63 is capable of externally acquiring accurate time information. The digital multifunctional peripheral 11 included in the image forming system 61 is the same as the digital multifunctional peripheral 11 illustrated in FIG. 2. Data regarding an expiration date is stored with data regarding the identification symbol of a toner container 41 in an IC chip 43 provided in the toner container 41, and the data regarding the expiration date may be read in a data reading unit 44 included in the digital multifunctional peripheral 11.

Figure 9:
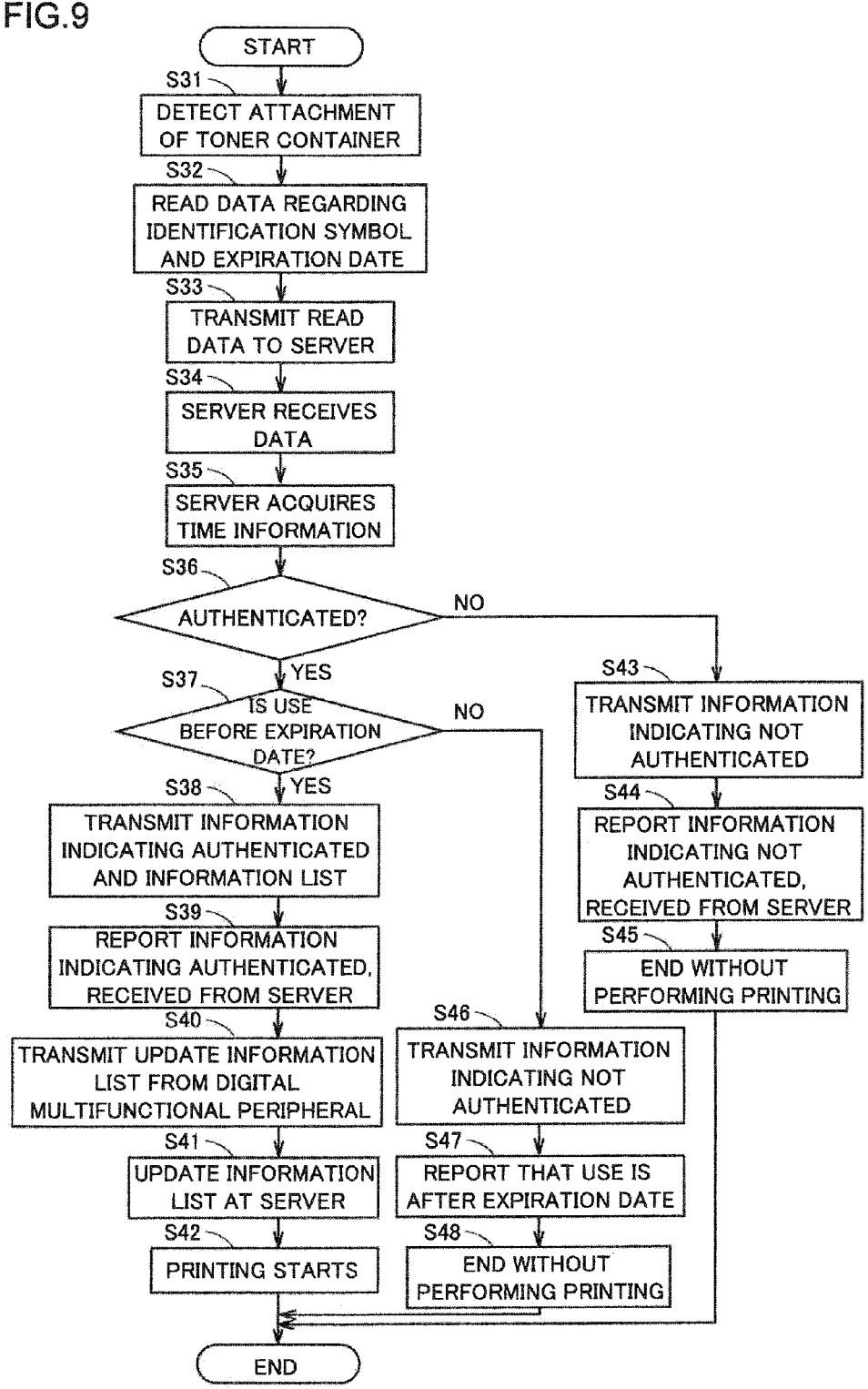
FIG. 9 is a flow chart illustrating contents of processing when authentication of a toner container is performed using an image forming system according to the another embodiment.

FIG. 9 is a flow chart illustrating contents of processing when authentication of a toner container is performed using the image forming system 61 according to the another embodiment. With reference to FIG. 9, when the attachable and removable toner container 41 was attached in the digital multifunctional peripheral 11 (S31), the data regarding the identification symbol and the data regarding the expiration date are read from the toner container 41 by the data reading unit 44 (S32). Thereafter, the data regarding the identification symbol and the data regarding the expiration date, which have been read, are transmitted to the server 62 (S33).

Next, the server 62 receives the data regarding the identification symbol and the data regarding the expiration date, which have been transmitted, through the server network interface unit 29 (S34). Next, the server 62 acquires time information through the time information acquisition unit 63 (S35). Thereafter, authentication of the toner container 41 is performed (S36). Specifically, whether or not the identification symbol is authenticated is determined. If it is determined that the identification symbol is authenticated (YES in S36), whether or not a use is before the expiration date is determined next (S37). That is, data of the acquired time information, and the received data regarding the expiration date are compared to each other, and whether or not a time point where the time information was acquired is before the expiration date is determined.

If it is determined that the use is before the expiration date (YES in S37), similar to S16 described above, the server 62 transmits information indicating that the identification symbol was authenticated, and an information list (S38). When the digital multifunctional peripheral 11 receives information indicating that the identification symbol was authenticated, the digital multifunctional peripheral 11 reports this on a display screen 21 of an operation unit 13 (S39).

Specifically, a message "TONER CONTAINER CAN BE USED." is displayed on the display screen 21 of the operation unit 13. Thereafter, similar to S18 and S19 described above, an update information list is transmitted from the digital multifunctional peripheral 11, the information list is updated at the server 62, and printing is started (S40 to S42).

Similar to the foregoing, if it is determined that the identification symbol is not authenticated (NO in S36), the server 62 transmits information indicating that the identification symbol was not authenticated (S43). When the digital multifunctional peripheral 11 receives a report of information indicating the identification symbol was not authenticated, the digital multifunctional peripheral 11 reports this on the display screen 21 of the operation unit 13 (S44). In this case, for example, as illustrated in FIG. 7, a message "ATTACHED TONER CONTAINER WAS NOT AUTHENTICATED." and a message "PLEASE REPLACE TONER CONTAINER.", urging a user to replace the toner container 41, are displayed on the display screen 21 of the operation unit 13. Thereafter, processing is ended without performing printing (S45).

Figure 10:
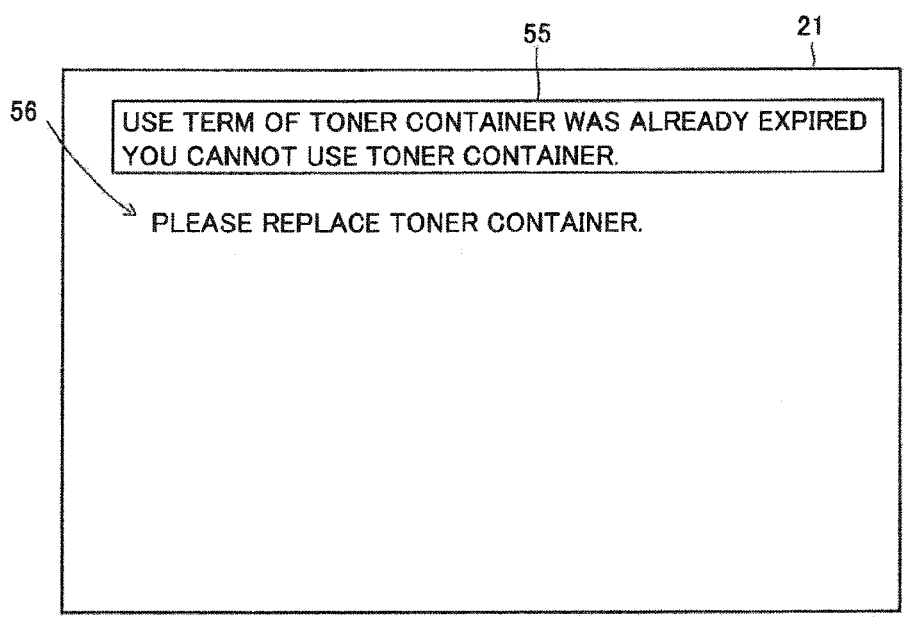
FIG. 10 is a view illustrating an example of a report screen displayed on a display screen included in the operation unit.

On the other hand, in S37, after it is determined that the identification symbol is authenticated, if it is determined that the use is not before the expiration date (NO in S37), the server 62 transmits information indicating that the identification symbol was not authenticated (S46). When the digital multifunctional peripheral 11 receives information indicating that the identification symbol was not authenticated, the digital multifunctional peripheral 11 reports this on the display screen 21 of the operation unit 13 (S47). Specifically, as illustrated in FIG. 10, a message 55 "USE TERM OF TONER CONTAINER WAS ALREADY EXPIRED. YOU CANNOT USE TONER CONTAINER." and a message 56 "PLEASE REPLACE TONER CONTAINER.", urging the user to replace the toner container 41 are displayed on the display screen 21 of the operation unit 13. Thereafter, processing is ended without performing printing (S48).

The above-described image forming system 61 is configured such that the server 62 includes the time information acquisition unit 63 configured to externally acquire time information, and thus, is capable of using the acquired time information to determine a lifetime of the toner container 41 in terms of time and determining whether or not a use is possible. With the above-described configuration, in addition to performing authentication using the identification symbol, the time information is externally acquired, and therefore, even when data regarding time in the digital multifunctional peripheral 11 is changed, an appropriate response may be given. Also, for example, a system that forms an image with high image quality may be maintained in a simple manner by performing management based on the expiration date even when a use term of a consumable member has not been physically expired.

In this case, the server 62 may be configured to use a time server. That is, the server 62 included in the image forming system 61 may be configured to be a time server.

An image forming system according to the present disclosure may include an image forming apparatus configured to form an image and a server coupled to the image forming apparatus so as to be communicable with the image forming apparatus, and may be configured such that the image forming apparatus includes an image forming apparatus transmission unit configured to transmit data regarding an expiration date provided to a consumable member attachably and removably provided in the image forming apparatus to the server, the server includes a server storage unit configured to store the data regarding the expiration date provided to the consumable member, a server reception unit configured to receive the data regarding the expiration date transmitted from the image forming apparatus transmission unit, a time information acquisition unit configured to acquire time information, a determination unit configured to determine from the data regarding the expiration date received by the server reception unit and the time information acquired through time information acquisition whether or not a use of the consumable member is before the expiration date, and a control unit configured to, if it is determined by the determination unit that the use is before the expiration date, perform control to make the consumable member usable. Thus, authentication of the consumable member may be also reliably performed, and burdens on a system side may be reduced.

Figure 11:
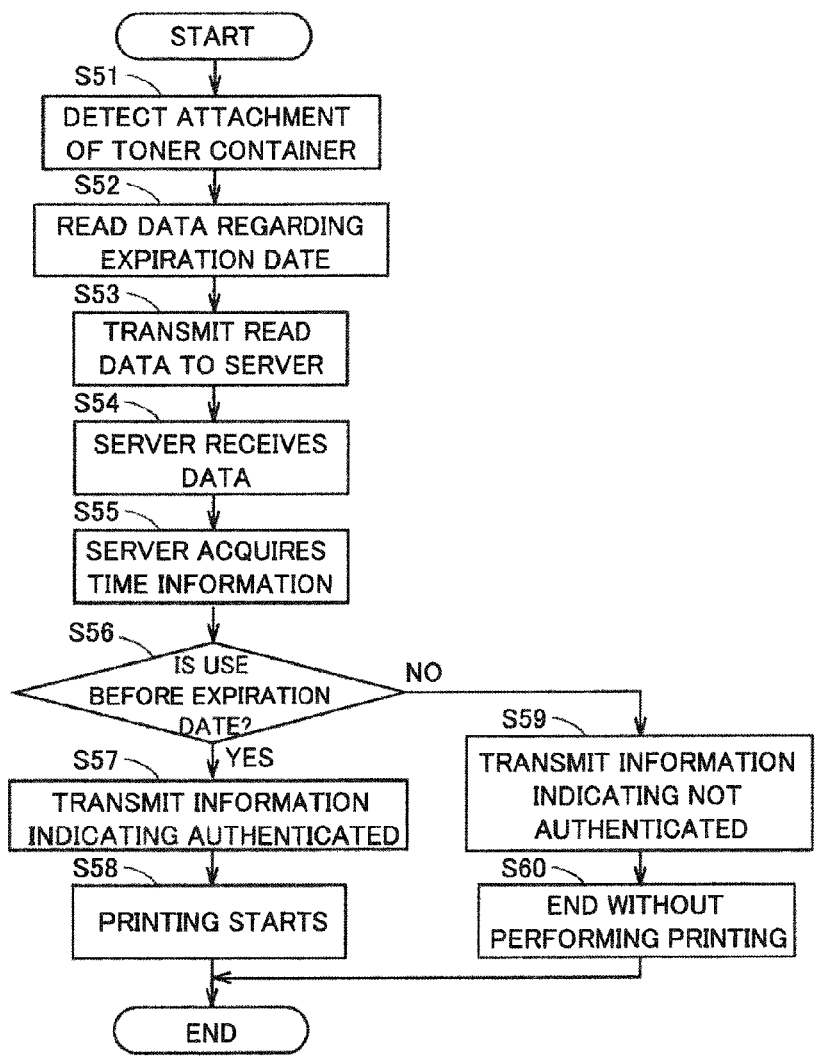
FIG. 11 is a flow chart illustrating contents of processing when authentication of a toner container is performed using an image forming system according to still another embodiment of the present disclosure.

FIG. 11 is a flow chart illustrating contents of processing when authentication of a toner container is performed using an image forming system 61 according to still another embodiment of the present disclosure. With reference to FIG. 11, when it is determined that a attachable and removable toner container 41 was attached in a digital multifunctional peripheral 11 (S51), data regarding an expiration date is read from the toner container 41 through a data reading unit 44 (S52). Thereafter, the read data regarding the expiration date is transmitted to a server 62 (S53).

Next, the server 62 receives the transmitted data regarding the expiration date through the server network interface unit 29 (S54). Next, the server 62 acquires time information through a time information acquisition unit 63 (S55). Thereafter, authentication of the toner container 41 is performed (S56). Specifically, whether or not a use is before the expiration date is determined That is, data of the acquired time information and the received data regarding the expiration date are compared to each other, and whether or not a time point where the time information was acquired is before the expiration date is determined.

If it is determined that the use is before the expiration date (YES in S56), similar to S16 described above, the server 62 transmits information indicating that the data regarding the expiration data was authenticated (S57). When the digital multifunctional peripheral 11 receives information indicating that the data regarding the expiration data was authenticated, the digital multifunctional peripheral 11 reports this on the display screen 21 of the operation unit 13. Specifically, a message "TONER CONTAINER CAN BE USED." is displayed on the display screen 21 of the operation unit 13. Thereafter, similar to the foregoing, an update information list is transmitted from the digital multifunctional peripheral 11, the information list is updated at the server 62, and printing is started (S58).

On the other hand, in S56, if it is determined that the use is not before the expiration date (NO in S56), the server 62 transmits information indicating that the data regarding the expiration date was not authenticated (S59). When the digital multifunctional peripheral 11 receives information indicating that the data regarding the expiration date was not authenticated, the digital multifunctional peripheral 11 reports this on the display screen 21 of the operation unit 13. Specifically, as illustrated in FIG. 10, a message 55 "USE TERM OF TONER CONTAINER WAS ALREADY EXPIRED. YOU CANNOT USE TONER CONTAINER." and a message 56 "PLEASE REPLACE TONER CONTAINER.", urging the user to replace the toner container 41, are displayed on the display screen 21 of the operation unit 13. Thereafter, processing is ended without performing printing (S60).

The above-described image forming system 61 is configured such that the server 62 includes the time information acquisition unit 63 configured to externally acquire time information, and thus, is capable of using the acquired time information to determine a lifetime of the toner container 41 in terms of time and thus determine whether or not a use is possible. With the above-described configuration, the time information is externally acquired, and therefore, even when data regarding time in the digital multifunctional peripheral 11 is changed, a proper response may be given. Also, for example, a system that forms an image with high image quality may be maintained in a simple manner by performing management based on the expiration date even when a user term of a consumable member has not been physically expired.

Note that the image forming system 61 illustrated in FIG. 11 is effectively used in the following case. That is, assume that, in a relationship with a business operator who provides an image forming system, a user sets an expiration date for a consumable member as a use contract, and sets a discount, instead. Thus, the user tries to form more images in order to consume a large amount of the consumable member. On the other hand, the business operator may expect regular purchase of the consumable member. The above-described image forming system brings a great advantage to the user, in particular, when the user consumes a large volume of the consumable member. In view of promoting increase in sales of consumables, the business operator may also enjoy advantages.

Note that, in each of the above-described embodiments, the server included in the image forming system may be a time server. Thus, time information may be more reliably acquired.

Although, in each of the above-described embodiments, the digital multifunctional peripheral and the server are coupled so as to be communicable with each other via a network, the present disclosure is not limited thereto, but a configuration in which the digital multifunctional peripheral and the server are coupled so as to be communicable with each other, for example, via a public line may be employed. As a matter of course, the above-described embodiments are applicable not only to the Internet, but also to an intranet or the like.

Note that, although, in each of the above-described embodiments, as a consumable member, a toner container is used, the present disclosure is not limited thereto, but the above-described embodiments may be applied to a member that is consumed in an image forming apparatus and, for example, are applicable specifically when a photoreceptor unit including a photoreceptor, a unit of a transfer system, or the like, is used as a consumable member.

The embodiments and examples disclosed herein are provided merely for illustrative purpose in every respect and are not intended to be limiting in any aspect. The scope of the present disclosure is defined by the scope of claims rather than the above-described description, and is intended to include any modifications within the scope and meaning equivalent to the terms of the claims.

An image forming system according to the present disclosure may reliably perform authentication of a consumable member and may be effectively used when it is required to reduce burdens on a system side.

What is claimed is:

1. An image forming system comprising:
   an image forming apparatus configured to form an image; and
   a server coupled to the image forming apparatus so as to be communicable with the image forming apparatus,
   wherein the image forming apparatus includes an image forming apparatus transmission unit configured to transmit data regarding an identification symbol given to a consumable member attachably and removably provided in the image forming apparatus to the server, and
   the server includes
   a server storage unit configured to store a list of the identification symbol given to the consumable member,
   a server reception unit configured to receive the data regarding the identification symbol transmitted from the image forming apparatus transmission unit,
   a determination unit configured to determine whether or not there is an identification symbol corresponding to the data regarding the identification symbol received by the server reception unit in the list of the identification symbol stored in the server storage unit, and
   a control unit configured to, if the determination unit determines that there is the identification symbol, perform control to make the consumable member usable, wherein the server storage unit is further configured to store data regarding other information corresponding to the identification symbol, and
   if the determination unit determines that there is the identification symbol, the control unit performs control such that the image forming apparatus transmission unit transmits the data regarding the other information corresponding to the identification symbol.

2. The image forming system according to claim 1,
   wherein the data regarding the identification symbol is a hash value generated by encryption using a hash function.

3. The image forming system according to claim 1,
   wherein the image forming apparatus further includes a data reading unit configured to read the data regarding the identification symbol stored in a consumable member storage unit included in the consumable member and configured to store the data regarding the identification symbol.

4. The image forming system according to claim 1,
   wherein the server further includes a time information acquisition unit configured to acquire time information, and
   the determination unit determines whether or not to make the consumable member usable in accordance with the time information acquired by the time information acquisition unit.

5. The image forming system according to claim 1,
   wherein the server is a time server.

\* \* \* \* \*